United States Patent
Scanlan et al.

(10) Patent No.: US 10,034,459 B1
(45) Date of Patent: Jul. 31, 2018

(54) MULTI-FUNCTION CAT TOY

(71) Applicant: Equipt4 LLC, Potomac, MD (US)

(72) Inventors: Holly Beth Scanlan, Potomac, MD (US); Scott Lawson Steagall, Rome, NY (US)

(73) Assignee: EQUIPT4 LLC, Rehoboth Beach, DE (US)

( * ) Notice: Subject to any disclaimer, the term of this patent is extended or adjusted under 35 U.S.C. 154(b) by 0 days.

(21) Appl. No.: 15/419,837

(22) Filed: Jan. 30, 2017

Related U.S. Application Data

(60) Provisional application No. 62/288,163, filed on Jan. 28, 2016.

(51) Int. Cl.
| | |
|---|---|
| *A01K 29/00* | (2006.01) |
| *A01K 15/02* | (2006.01) |
| *H05K 5/00* | (2006.01) |
| *H01R 24/62* | (2011.01) |
| *H02J 7/00* | (2006.01) |
| *F21L 4/08* | (2006.01) |
| *F21V 23/04* | (2006.01) |
| *F21V 33/00* | (2006.01) |
| *H04R 1/02* | (2006.01) |
| *H04R 3/00* | (2006.01) |
| *H01R 107/00* | (2006.01) |

(52) U.S. Cl.
CPC .......... *A01K 15/025* (2013.01); *A01K 15/021* (2013.01); *F21L 4/08* (2013.01); *F21V 23/0414* (2013.01); *F21V 33/008* (2013.01); *H01R 24/62* (2013.01); *H02J 7/0047* (2013.01); *H04R 1/028* (2013.01); *H04R 3/00* (2013.01); *H05K 5/0086* (2013.01); *H01R 2107/00* (2013.01); *H02J 2007/0049* (2013.01)

(58) Field of Classification Search
CPC .... A01K 15/025; A01K 15/02; A01K 15/027; A01K 15/00
USPC ........ 119/702, 707, 708, 709, 710, 711, 706
See application file for complete search history.

(56) References Cited

U.S. PATENT DOCUMENTS

| | | | | |
|---|---|---|---|---|
| 4,231,077 | A * | 10/1980 | Joyce | A63H 33/22 362/109 |
| 5,045,014 | A * | 9/1991 | Harkins | G09F 19/02 446/236 |
| 5,443,036 | A | 8/1995 | Amiss | |
| 5,823,844 | A * | 10/1998 | Markowitz | A63H 11/02 119/707 |
| 8,978,591 | B2 * | 3/2015 | Cogswell | A01K 15/025 119/708 |
| 8,997,695 | B2 * | 4/2015 | Riding | A01K 15/025 119/707 |
| 2007/0056531 | A1 | 3/2007 | Renforth | |

(Continued)

OTHER PUBLICATIONS

Groupon, Jackson Galaxy Air Wand Cat Toy with Laser Attachment, URL https://www.groupon.com/deals/gg-jackson-galaxy-air-wand-cat-toy-with-laser-attachment, retrieved Nov. 4, 2015.

*Primary Examiner* — Trinh T Nguyen
(74) *Attorney, Agent, or Firm* — Law Office of Oliver Edwards LLC; Oliver Edwards

(57) ABSTRACT

A multi-function cat toy is disclosed. The toy has a physical cat-attracting toy such as a feather clump, a light pointer and a sound chip for producing cat interest-piquing sounds. The toy may include batteries rechargeable through connecting the toy to a USB-powered connector.

18 Claims, 3 Drawing Sheets

(56) References Cited

U.S. PATENT DOCUMENTS

2012/0097113 A1\* 4/2012 McKinney ........... A01K 15/025
 119/707
2012/0298049 A1 11/2012 Cook et al.
2013/0300863 A1 11/2013 Tait
2015/0128866 A1\* 5/2015 Madorin ............... F41H 11/132
 119/51.01

\* cited by examiner

MULTI-FUNCTION CAT TOY

This application claims priority to provisional application No. 62/288,163, filed Jan. 28, 2016, the contents of which are hereby incorporated in their entirety.

BACKGROUND

Field of the Invention

The present invention relates to the entertainment of kittens and cats through the use of a handheld multifunctional device.

Description of the Related Art

There exist cat toys that use a laser to project a small dot on the floor and encourage the cat to chase it. Separately, there exist cat toys that use feathers/toys on the end of a string attached to a wand to dangle in front of the cat and bring out the hunter instinct. Separately, there exist methods of using sound, like a small metal bell, as a means to summon a cat/kitten to play. Most of these devices and methods are independent of one another.

SUMMARY OF INVENTION

In an exemplary embodiment of the present invention, there is provided a self-contained, multifunctional cat/kitten entertainment device. The components, wand with feather attachments, light pointer and sound chip are combined in one unit. The light pointer and sound chip are housed inside the handle of the device. The wand with string and detachable feather toy is threaded on one end so it can be screwed into the handle for easy assembly and to break it down for storage. The handle has finger grips designed so the user can hold the device while pointing it in either direction depending on what function (feather teaser, light pointer) is being used at the time.

In some embodiments, there is a multi-function pet toy having a hand-holdable body including finger grip contours, a multi-section mast extending from the body, a pet attracting object attached to the mast, a sound generator in the body configured to generate sounds attracting the interest of the pet, a light pointer in the body configured to direct a point beam of light in a direction opposite the mast, a rechargeable battery for providing power to the sound generator and to the light pointer, a USB-style port for recharging the battery when a powered-USB cable is attached, a switch configured to actuate the sound generator, and a switch configured to actuate the light pointer.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

Figure 1:
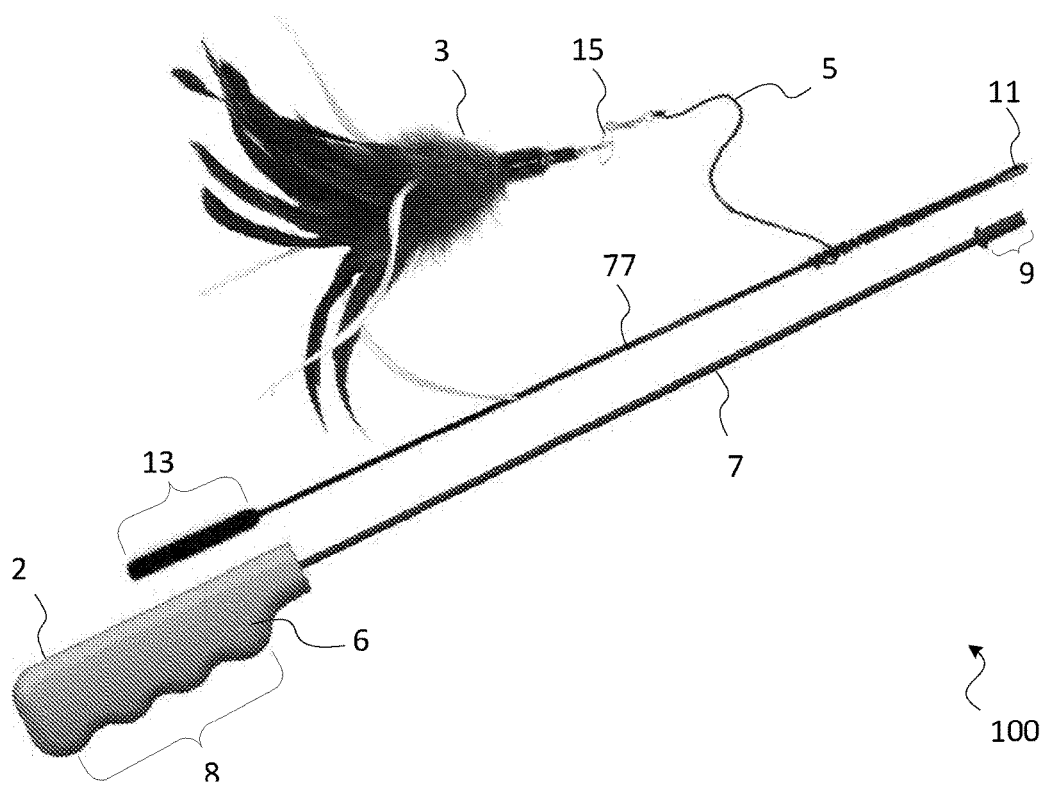
FIG. 1 is a side view illustration of an exemplary embodiment of the present invention.
Figure 2:
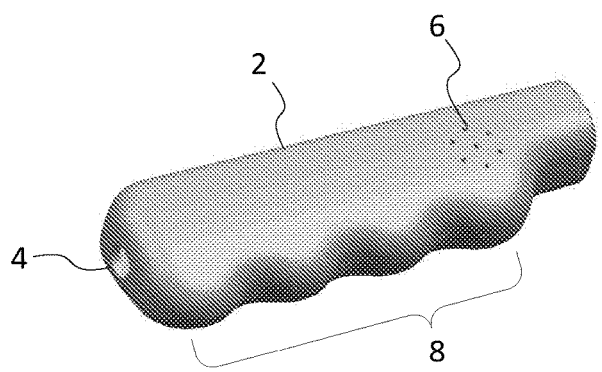
FIG. 2 is a perspective illustration of a handle in accordance with an exemplary embodiment of the present invention.
Figure 3:
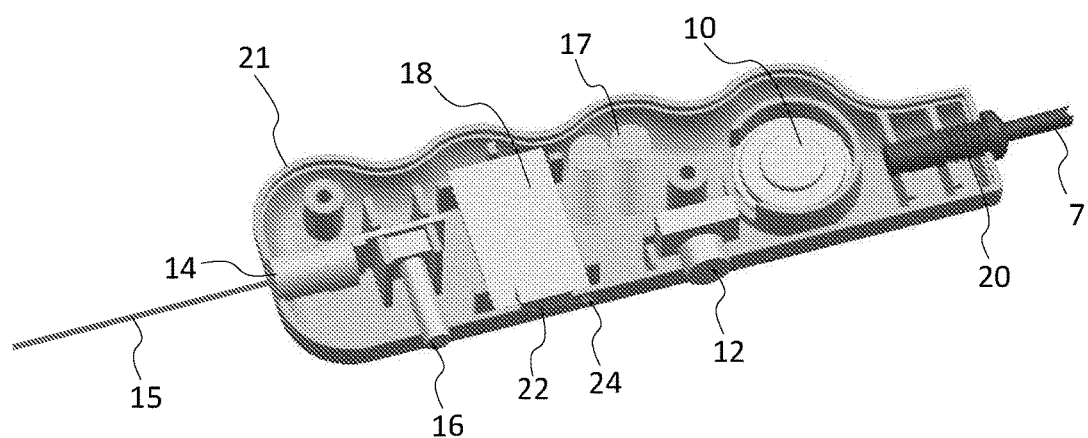
FIG. 3 illustrates a perspective cut-away view in accordance with an exemplary embodiment of the present invention, wiring omitted for clarity.

With reference to FIGS. 1-3, a first exemplary embodiment of the present invention is shown. Multi-function cat toy 100 may comprise a handle 2 having molded finger grip section 8. Handle 2 may be fabricated from an injection-moldable plastic such as ABS (acrylonitrile butadiene styrene), polypropylene or polyethylene. Extending from handle 2 is a wand or boom. The boom may comprise a lower (or near) boom section 7 and an upper (or far) boom section 77. Boom sections 7 and 77 may be connectable via threaded male section 9 and matching threaded female section 13. In some embodiments, the boom is unitary rather than sectioned. In some embodiments, the boom may be rigid; alternatively, the boom may be capable of flexing. The boom may be plastic or, a resin-fiberglass composite or plastic coated spring wire. In an exemplary embodiment, handle 2 comprises two halves, half 21 illustrated, fastenable together with, for example, screws (not shown). In another exemplary embodiment, boom 7 is capable of telescoping to achieve variations in length (not illustrated). The boom may be threaded into handle 2 with a threaded section 20 on the proximal end of the boom. In another exemplary embodiment, boom 7 is frictionally held in place in a corresponding unthreaded socket in handle 2.

At the end of the boom distal from handle 2 is a cat-attracting toy such as feather clump 3. In some embodiments, the cat-attracting toy is attached to the boom with a line 5. The use of a line such as line 5 allows the user to "cast" the cat-attracting toy further away for more varied play. The cat-attracting toy, such as feather clump 3, can be switched with different cat-attracting toys by unlinking catch assembly 15 and linking on the different cat-attracting toy. The very distal end of the boom may comprise a safety cap 11.

Multi-function cat toy 100 includes a sound generator such as sound chip 18, actuable by switch 12. When switch 12 is actuated, the sound generator sends a sound signal to transducer 10 so that audible sound is generated. Sounds generated by the sound generator may include, for example, sounds of birds chirping. More generally, the sound generator can generate a "call to action" to the cat; that is, sounds known to pique the interest and curiosity of cats. Other sounds may include mice squeaking, chipmunk chirps, squirrel chatter or any other small animal noise. Switch 12 may be a click-on, click-off switch. In an alternative embodiment, switch 12 is a press-and-hold switch or touch switch so that sound is only generated while the user is touching or holding down switch 12. Holes 6 may be disposed adjacent to transducer 10 so that the sounds may more freely be transmitted by toy 100.

In some embodiments, batteries 17 are disposed within handle 2 for powering light pointer 14 and the sound generator. In some embodiments, batteries 17 are permanent. In other embodiments, batteries 17 are replaceable. In some embodiments, batteries 17 may be recharged by connecting a power supply to power port 22. In some embodiments, power port 22 is a USB-compatible connection such as a mini-USB or a micro-USB connection, permitting use of widely available USB cables and USB power-supplying devices for charging of toy 100. Indicator 24, for example, an LED, may be activated when batteries 17 are determined to be adequately charged. Light pointer 14 is configured to project a visually perceptible spot beam up to several meters. Light pointer 14 may comprise a laser module. In some embodiments, light pointer 14 may comprise an LED module.

Figure 4:
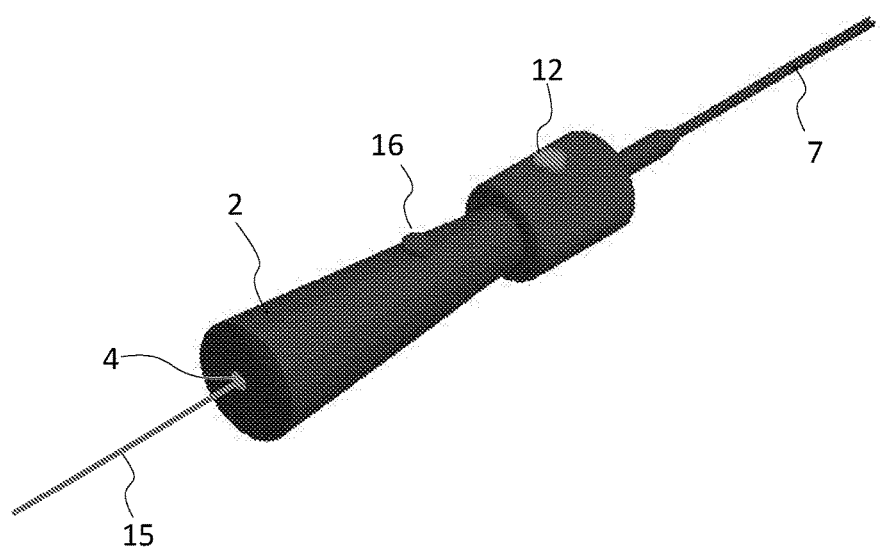
FIG. 4 illustrates a perspective view in accordance with an alternate exemplary embodiment of the present invention.
Figure 5:
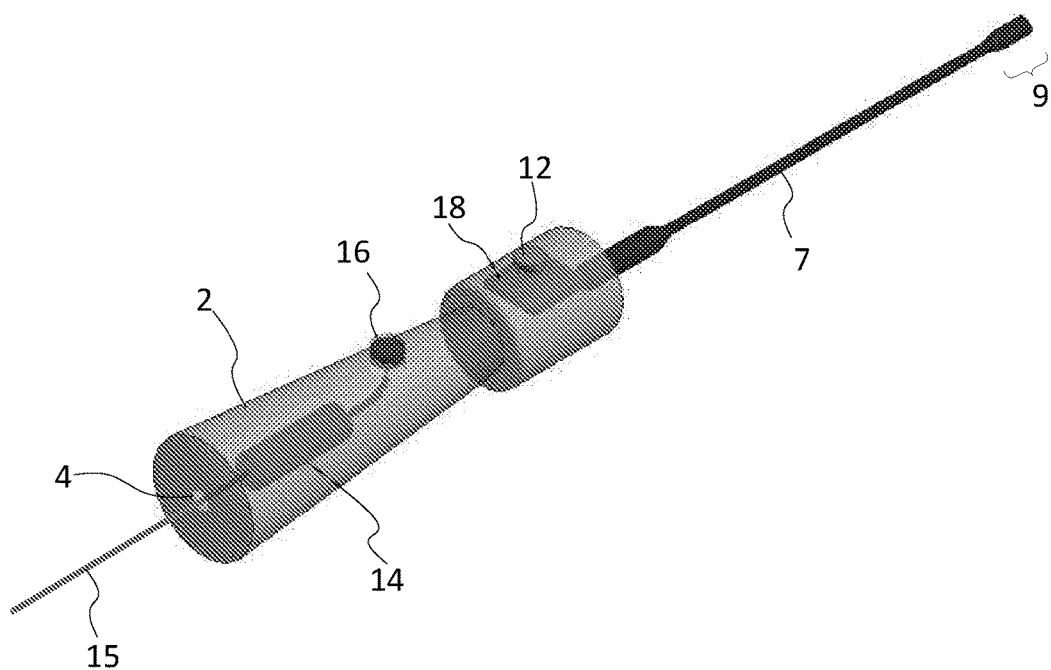
FIG. 5 illustrates a perspective semi-transparent view in accordance with an alternate exemplary embodiment of the present invention
Figure 6:
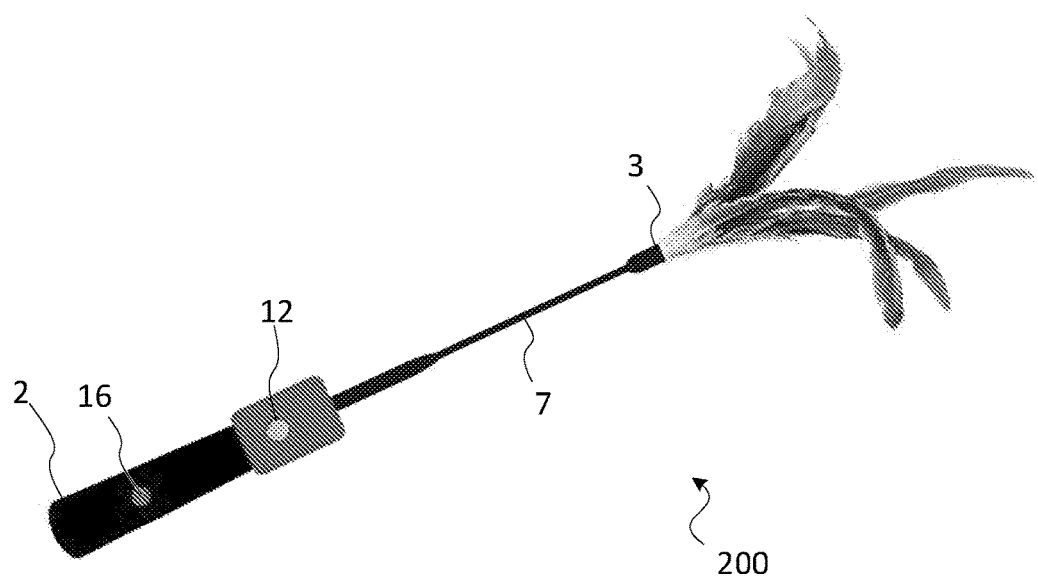
FIG. 6 illustrates a side view of an exemplary embodiment of the present invention.

With reference to FIGS. 4-6, an alternate embodiment of a cat toy in accordance with the present inventive concept is disclosed. Toy 200 has most features in common with toy 100, except handle 2 does not have molded finger grips 8. Further, in some embodiments, the cat-attracting toy can be attached directly to the boom via section 9.

In an alternative embodiment (not illustrated), light pointer 14 and aperture 4 are configured to direct beam 15 in the same general direction of boom 7's extension from the handle.

It should be emphasized that the above-described embodiments of the present disclosure are merely possible examples of implementations set forth for a clear understanding of the principles of the disclosure. Many variations and modifications may be made to the above-described embodiments without departing substantially from the spirit and principles of the disclosure. All such modifications and variations are intended to be included herein within the scope of this disclosure and protected by the patent's claims.

We claim:

1. A multi-function pet toy comprising:
a hand-holdable body including finger grip contours;
a multi-section mast extending from the body in a first direction along an axis;
a pet attracting object attached to the mast distal from the body;
a sound generator disposed in the body configured to generate sounds attracting the interest of the pet;
a light pointer disposed in the body configured to direct a visually perceptible point beam of light along the axis in a direction opposite the first direction;
a rechargeable battery disposed in the body for providing power to the sound generator and to the light pointer;
a USB-style port disposed on the body for recharging the battery when a powered-USB cable is attached thereto;
a switch disposed in the body configured to actuate the sound generator; and
a switch disposed in the body configured to actuate the light pointer.

2. A multi-function pet toy comprising:
a hand-holdable body;
a boom extending from the body;
a pet attracting object attached to the boom distal from the body;
a sound generator disposed in the body configured to generate a sound attracting the interest of the pet;
a light pointer disposed in the body configured to direct a visually perceptible point beam of light;
a rechargeable battery disposed in the body for providing power to the sound generator and to the light pointer;
a USB-style port disposed on the body for recharging the battery when a powered-USB cable is attached thereto;
at least one switch disposed in the body configured to actuate the sound generator, the light pointer, or both.

3. The multi-function pet toy of claim 2, wherein the hand-holdable body comprises a threaded socket and the boom comprises a threaded shank, the shank and socket permitting a user to attach or detach the boom from the body with a screwing motion.

4. The multi-function pet toy of claim 3, wherein the boom comprises a proximal section threadably connectable to a distal section.

5. The multi-function pet toy of claim 2, wherein the pet attracting object is a clump of feathers.

6. The multi-function pet toy of claim 2, wherein the pet attracting object is attached to the distal end of the boom by a line.

7. The multi-function pet toy of claim 6, wherein the end of the line distal to the boom includes a catch assembly configured to permit attachment and detachment of the pet attracting object.

8. The multi-function pet toy of claim 2, wherein the light pointer comprises a laser module.

9. The multi-function pet toy of claim 2, wherein the light pointer comprises an LED module.

10. The multi-function pet toy of claim 2, wherein the boom is flexible.

11. The multi-function pet toy of claim 2, wherein the boom comprises a safety cap at the distal end.

12. The multi-function pet toy of claim 2, wherein the sounds include sounds of birds.

13. The multi-function pet toy of claim 2, wherein the at least one switch is a press-and-hold switch.

14. The multi-function pet toy of claim 2, wherein the at least one switch is a click-on, click-off switch.

15. The multi-function pet toy of claim 2, further comprising a charged indicator disposed on the body configured to indicate when the battery is adequately charged.

16. The multi-function pet toy of claim 2, wherein the boom is a length-variable telescoping boom.

17. The multi-function pet toy of claim 2, wherein the light pointer is disposed to direct a beam of light substantially in the same direction as the boom.

18. The multi-function pet toy of claim 2, wherein the light pointer is disposed to direct a beam of light substantially in the opposite direction as the boom.

* * * * *